United States Patent [19]
Goshima et al.

[11] 3,982,253
[45] Sept. 21, 1976

[54] OPTICAL SYSTEM FOR OBTAINING LINEAR IMAGE AND RECORDED DEVICE UTILIZING THE OPTICAL SYSTEM

[75] Inventors: Takeshi Goshima, Tokyo; Kiyonobu Endo, Yokohama, both of Japan

[73] Assignee: Canon Kabushiki Kaisha, Tokyo, Japan

[22] Filed: Feb. 28, 1975

[21] Appl. No.: 554,196

[30] Foreign Application Priority Data
Mar. 4, 1974 Japan.............................. 49-25563

[52] U.S. Cl................................... 354/4; 350/19; 350/271; 346/108; 355/2
[51] Int. Cl.²......................................... G03B 41/00
[58] Field of Search............... 354/4, 12; 355/2, 98; 350/19, 266, 271; 346/107, 108, 137, 109

[56] References Cited
UNITED STATES PATENTS

| | | | |
|---|---|---|---|
| 2,426,367 | 8/1947 | Maurer, Jr. | 346/108 |
| 3,295,142 | 12/1966 | Slavens | 355/2 |
| 3,312,955 | 4/1967 | Lamberts et al. | 346/108 |
| 3,365,724 | 1/1968 | Brown et al. | 346/109 |
| 3,523,727 | 8/1970 | Simon | 346/107 R |
| 3,805,275 | 4/1974 | Kiemle et al. | 346/107 R |

*Primary Examiner*—Russell E. Adams, Jr.
*Attorney, Agent, or Firm*—Fitzpatrick, Cella, Harper & Scinto

[57] ABSTRACT

A linear image composition device comprising a beam generator, a first rectangular beam producer for causing the beam generated by the beam generator to be a first parallel light beam with rectangular cross section, a second rectangular beam producer for causing the rectangular beam obtained by the first rectangular beam producer to be a second parallel light beam with rectangular cross section different from that of the first parallel light beam, and a beam condenser to which the parallel light beam with rectangular cross section produced in the record rectangular beam producer is applied.

8 Claims, 12 Drawing Figures

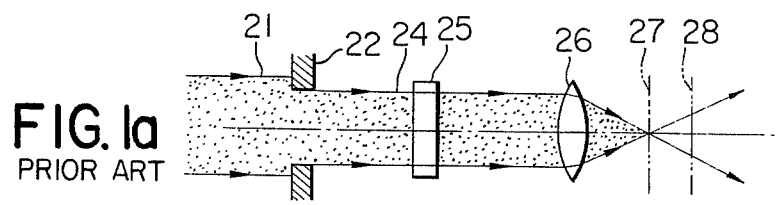
FIG. 1a PRIOR ART
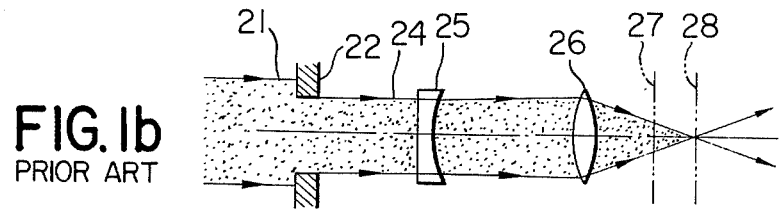
FIG. 1b PRIOR ART
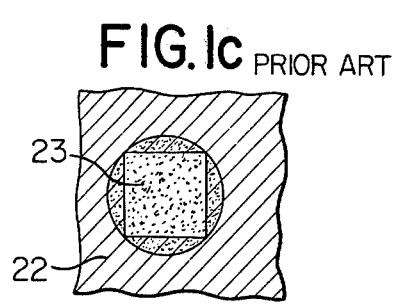
FIG. 1c PRIOR ART
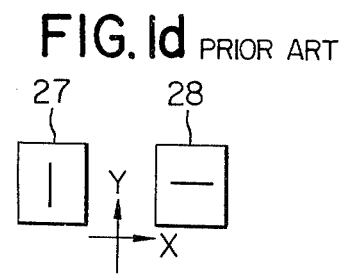
FIG. 1d PRIOR ART
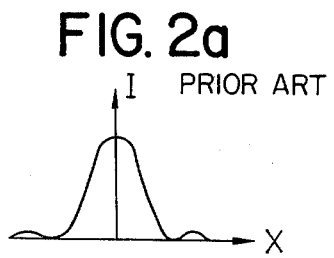
FIG. 2a PRIOR ART
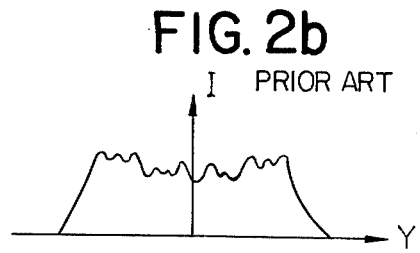
FIG. 2b PRIOR ART
FIG. 2c PRIOR ART
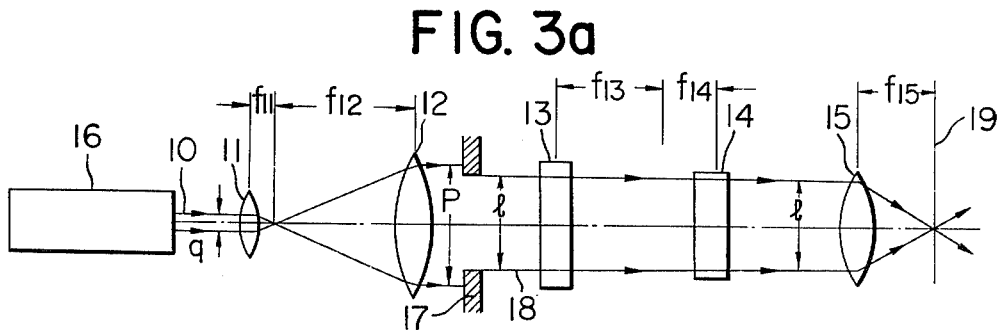
FIG. 3a
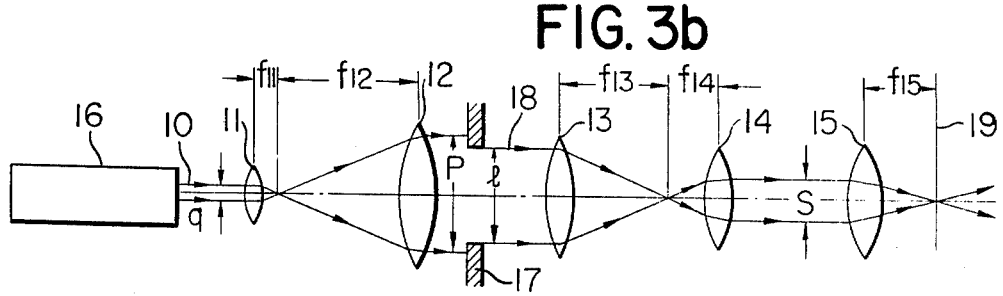
FIG. 3b

OPTICAL SYSTEM FOR OBTAINING LINEAR IMAGE AND RECORDED DEVICE UTILIZING THE OPTICAL SYSTEM

BACKGROUND OF THE INVENTION

1. Field of the Invention

This invention relates to an optical system for composing a linear image and to a recorder device utilizing the optical system for recording information on a photosensitive body.

2. Description of the Prior Art

In the prior art, an optical system for obtaining a micro linear image has been proposed, in which a cylindrical lens with negative reflectively is used to disperse a light beam in one direction and thereafter, the light beam is converged with a converging lens.

Such an optical system is shown in FIG. 1, in which the reference number 21 indicates a parallel light beam of a laser beam emitted, for example, from a laser beam source and expanded in width with a beam expander, usually taking a circular cross section. The parallel beam 1 is converted, with a mask 22 (shown in FIG. 2C) set in the light beam, having a rectangular opening 23, into a parallel light beam 24 with a rectangular cross section corresponding to said rectangular opening. The number 25 is a cylindrical lens with, for example, negative reflectivity, which diverges the light beam 24 only in the generatrix direction of the lens (the arrow mark S direction indicated by the dot line in FIG. 1b). As a result, the light beam incident upon a condenser lens 26 comprising convex lenses is a spherical wave diverging in the generatrix direction of the cylindrical lens 25, forming a parallel light beam in the direction vertical to the generatrix. When such a light beam is entered into the condenser lens 26, as shown in FIG. 1a, a parallel light beam component is first condensed on a focal plane 27 of the lens 26 and then diverged again, while a spherical wave component is not condensed on the focal plane 27 and as shown in FIG. 1b, it is condensed on another plane 28. This plane 28 is a composite focal plane of the cylindrical lens 25 and the condenser lens 26. Now, when the distribution of light on the focal planes 27 and 28, respectively is observed, as shown in FIG. 1d, an optical line extending in the generatrix direction of the clindrical lens 25 is obtained in the plane 27, while an optical line extending in the direction vertical to that generatrix is obtained on the plane 28. In addition, in FIG. 1d, the sign Y indicates the generatrix direction of the cylindrical lens and X the direction vertical to the generatrix, respectively.

In the optical system shown in FIG. 1, if the intensity distribution of a linear image, obtained on the focal plane 27, for example, is examined, the following fact will become obvious.

The intensity distribution of a linear image can be analytically obtained by utilizing Fresnel's diffractive integration. FIG. 2 shows the distribution in the vertical direction to the generatrix of the cylindrical lens 25 (that is, the width direction of a linear image) and the distribution in the generatrix (that is, the length direction of a linear image) (the signs X and Y in this drawing are the same as used in the previous description). As seen in FIG. 2a, while the width direction of a linear image has a smooth distribution represented by the function called Sinc-function, the length direction takes a distribution with complex intensity changes as shown in FIG. 1b. If a linear image with such latter intensity distribution is recorded on a photosensitive material such as a photo resist, the recording will have the contour of a concave-convex line as shown in FIG. 1c, because of the uneven exposure to the photo resist. That is, as shown in FIG. 1 the light beam has different focal planes in the directions vertical to each other. There has been employed another method for obtaining a linear image, in which a parallel light beam is irradiated to a converging lens through a shading plate having a slit-like opening to obtain a linear image on the focal plane of the converging lens. However, in this method, since a light beam is made in a slit-like shape due to the shading plate, the beam is almost intercepted with the shading plate permitting little to pass therethrough. Thus, the utility of the light beam is less efficient and the formation of a high energy linear image is difficult.

SUMMARY OF THE INVENTION

This invention eliminates the above mentioned disadvantage.

It is an object of the invention to provide a linear image composition device for giving a clear linear image.

It is another object of the invention to provide a linear image composition device capable of making a linear image with high efficiency by a beam obtained from a beam generator.

It is a further object of the invention to provide a linear image composition device constructed in a very simple manner for composing a clear and high energy linear image.

It is a still further object of the invention to provide a recorder device utilizing a clear and high energy linear image.

Other objects and effects of the invention will become obvious from the description taken in conjunction with the accompanying drawings.

BRIEF DESCRIPTION OF THE DRAWINGS

FIGS. 1(a) to 1(c) illustrate a conventional linear image composition device, in which FIG. 1(a) is a top view of the device, FIG. 1(b) is a side view thereof, FIG. 1(c) is a front view of a shading plate and FIG. 1(d) is a view showing an obtainable linear image.

FIGS. 2(a) to 2(c) illustrate the energy distribution of a linear image obtainable from the device shown in FIGS. 1(a) to 1(c), in which FIG. 2(a) indicates the energy distribution in the width direction of the linear image, FIG. 2(b) indicates the energy distribution in the length direction thereof and FIG. 2(c) indicates an exposure trance of a photosensitive body exposed by the linear image.

FIG. 3(a) and subsequent drawings are views supplied for the explanation of the invention; FIGS. 3(a) to 3(c) a illustrate linear image composition device according to the invention, in which FIG. 3(a) is a top view of the device, FIG. 3(b) is a side view thereof and FIG. 3(c) shows the cross section (shape of a beam obtained at each part of FIGS. 3(a) and 3(b).

DESCRIPTION OF THE PREFERRED EMBODIMENTS

Figure 3C:
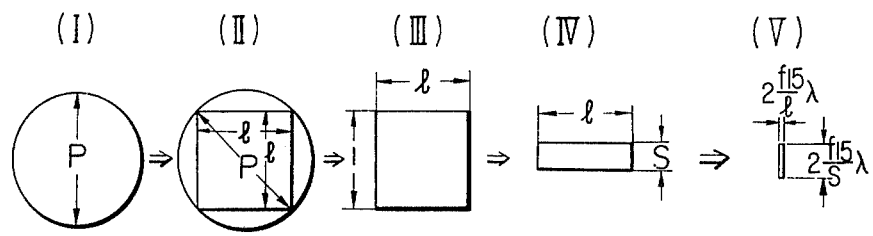

The invention is described hereinafter with reference to the drawings in which one embodiment is shown. FIGS. 3(a) to 3(c) illustrate an optical system for obtaining a linear image according to the invention. In the optical system shown in FIGS. 3(a) to 3(c), the reference numbers 11, 12 and 15 are ordinary circular converging lenses having focal distances $f_{11}$, $f_{12}$ and $f_{15}$, respectively. The numbers 13 and 14 are cylindrical lenses with focal distances $f_{13}$ and $f_{14}$, respectively. In this optical system, the lenses 11 and 12 are afocal lenses, which are arranged in a form permitting common the use of the focal planes of each lens. The cylindrical lenses 13 and 14 are also afocal lenses, that is, they are arranged in a form to allow for the common use of their focal planes. It is assumed to this optical system that a parallel laser beam 10 which is emitted from a laser generator 16, is entered into an afocal optic system comprising lenses 11 and 12. If the parallel beam 10 has a circular cross section and the diameter of the circular section is q, a light beam (the cross section thereof is shown in FIG. 3(c)I) coming out of the afocal optics, comprising the lenses 11 and 12, also has a circular cross section, but the diameter P thereof for a parallel light beam is given in the equation below:

$$P = \frac{f_{12}}{f_{11}} q$$

Disposed just behind the lens 12 is a shading plate 17 with a square opening $l \times l$ as shown in FIG. 3c(II), which converts the cross section shape of a parallel light beam incident upon the lens 13 from circular shown in FIG. 3c(I) to square as shown in FIG. 3c(III).

If the largeness of the light beam and the size of the square opening provided in the shading plate are made so that the square opening inscribes the light beam with a circular cross section coming out through a converging lens as shown in FIG. 3c(II), the optical energy passing through the shading plate 17 takes about 64 percent of that irradiated to the plate 17. This provides a remarkable energy increase as compare with the approximately 25 percent in the case where a mask with a rectangular slit is placed directly before a condenser lens for obtaining a linear image.

The parallel light beam 18 passed through the shading plate 17 is then transmitted into the afocal lens, comprising the cylindrical lenses 13 and 14. As a cylindrical lens functions to reflact a light beam only in its generatrix direction, the component in the vertical direction to the generatrix comes out of the afocal optics, comprising the cylindrical lenses 13 and 14, with the width $l$ maintained as shown in FIG. 3c(IV), and enters into the converging lens 15.

The generatrix direction component of the light beam 17 comes out of the afocal optics with a width obtained by the following equation, and enters into the converging lens 15.

$$S = \frac{f_{14}}{f_{13}} l$$

In other words, the cross section of the light beam incident upon the condenser lens 15 takes a rectangular shape of $S \times l$. Besides, this rectangular light beam is composed of a parallel light beam. Therefore, as shown in FIGS. 3a and 3b, this light beam is focalized on the focal plane 19 either in the X or Y direction thereof and as shown in FIG. 1, since it does not have two focal planes, a smooth optical intensity distribution represented by a Sinc function results in both the width and length directions of a linear image, and thus a clear linear image pattern is obtained. The linear image obtained then has a width of $$2 \frac{f_{15}}{l} \lambda$$

and a length of $$2 \frac{f_{15}}{S} \lambda$$

as shown in FIG. 3c(V). As described heretofore, according to the invention, a very clear linear image is obtainable as well as increasing the utility efficiency of the energy generated from the laser generator.

Figure 4:
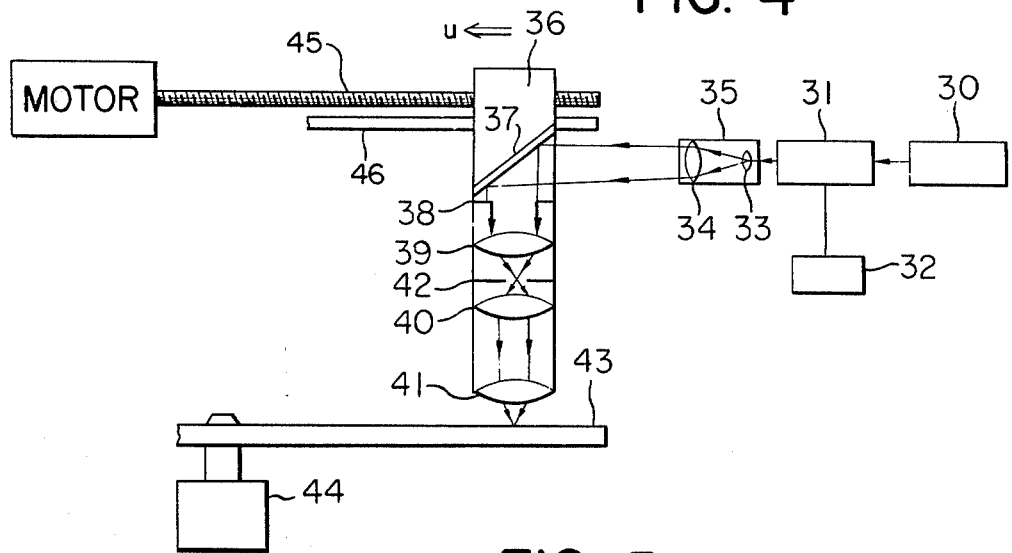
FIG. 4 is a side view of a recorder device utilizing the linear image composition device shown in FIG. 3.
Figure 5:
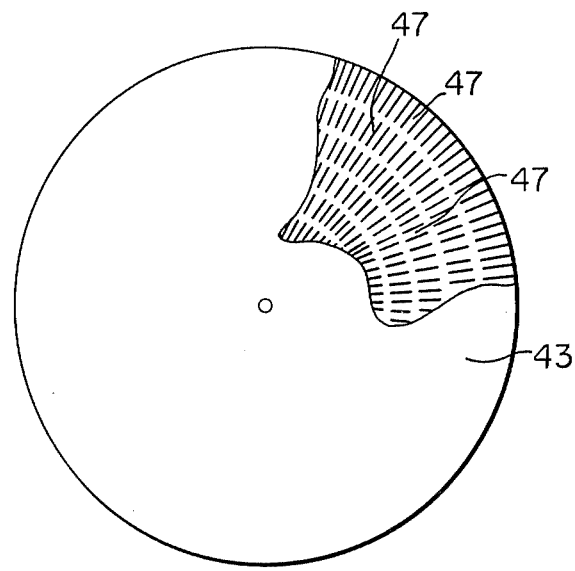
FIG. 5 is a plan view of a recording medium with a recording effected thereon by the recorder device shown in FIG. 4.

Now, one embodiment of a linear image recorder, utilizing an optical system of the invention, is described. FIG. 4 shows an optical system for recording a TV signal, for example, on a rotary recording body in a linear image pattern. The laser beam emitted from a laser source 30 receives bright and dark modulation by means of a signal from a TV signal source 32. The modulated laser beam is magnified to the desired size by means of afocal optics 35, comprising circular lenses 33 and 34 corresponding to the previously mentioned lenses 11 and 12, and directed downward with a mirror 37, provided stationary on a support body 36, and then made to have the cross section of rectangular optical distribution through a mask 38, which is the same as the previous shading plate 38, having a rectangular opening. The light beam, with the cross section of rectangular optical distribution, is entered into an afocal optics, consisting of the next cylindrical lenses 39 and 40 corresponding to the previous cylindrical lenses 13 and 14, to change the width of only the component in the generatrix direction of the lenses 39 and 40, and then transmitted into a condenser lens 41 having the same function as the previous lens 15. The number 42 is a slit-like opening which is arranged to remove the diffractive effect that the light beam has received in the preceeding optics, and which is disposed on the common focal plane of the cylindrical lenses 39 and 40. The light beam incident upon the condenser lens 41 has a rectangular distribution as shown in FIG. 3c(IV), and therefore a linear image pattern as shown in FIG. 3c(V) can be obtained on the focal plane of the lense. Then, a photosensitive disk body 43 with a plane surface as shown in FIG. 5 is arranged on that focal plane and this photosensitive body is set to be rotated by a motor 44, and a support body 36, containing the mirror 37, with the rectangular opening mask 38, slit-like opening 42, cylindrical lenses 39, 40 and converging lens 41 is arranged to move along a guide rod 46, in the arrow mark U direction, in parallel to the surface of said photosensitive body 43 and in the radial direction thereof by means of a feed screw 45. If the support body 36 and the photosensitive body 43 are driven in this way, as well as the beam modulation of the TV signal source 32, the photosensitive body records the TV signal, converted to a linear image space along a signal track 47 as shown in FIG. 5 (in the drawing, the signal record track is partially shown). In order to arrange the linear image along the radial direction of the photosensitive body as above, the generatrix of the cylindrical lenses 39 and 40 provided stationary on the support body 36, must be moved it the radial direction of the photosensitive disk body.

As described heretofore, the invention is an optical system which combines afocal optics comprising circular lenses and afocal optics comprising cylindrical lenses, and which overcomes the prior art faults and realizes a high efficient utilization of the light energy for obtaining a clear linear image.

We claim:

1. A linear image composition device comprising:
   a beam generator means for generating a beam;
   a first rectangular beam producing means for causing the beam generated by said beam generator means to be a first parallel light beam with rectangular cross section;
   a second rectangular beam producing means for producing a second parallel light beam with rectangular cross section the ratio of the length and breadth of which exceeds that of said first parallel light beam, said second parallel light beam being produced from said first parallel light beam by using a plurality of lenses; and
   a beam converging means to which the second parallel light beam with rectangular cross section is applied.

2. A device of claim 1, in which said first rectangular beam producing means comprises an afocal lens consisting of a plurality of lenses with common focal plane and a mask having a rectangular shape opening for partially shading the beam emitted from said afocal lens.

3. A linear image composition device comprising:
   a beam generator means for generating beam;
   a first rectangular beam producing means for causing the beam generated by said beam generator means to be a first parallel light beam with rectangular cross section;
   a second rectangular beam producing means for causing the rectangular beam obtained by said first rectangular beam producing means to be a second parallel light beam with rectangular cross section different from that of the first parallel light beam, said second rectangular beam producing means including an afocal lens comprising a plurality of cylindrical lenses with common focal plane; and
   a beam converging means to which the parallel light beam with rectangular cross section produced in said second rectangular beam producing means is applied.

4. A linear image composition device comprising:
   a laser generator for generating parallel laser;
   a first afocal lens comprising a plurality of lenses with common focal plane for magnifying diameter of the laser beam obtained from said laser generator;
   a mask having a rectangular shape opening for causing the cross section of the beam with magnified diameter obtained through said first afocal lens to be a first rectangular shape;
   a second afocal lens comprising a plurality of cylindrical lenses with common focal plane for causing the beam passed through said mask with the cross section made to be said first rectangular shape to have a second rectangular shape different from the first one; and
   a converging lens to converge the beam with the second rectangular shape cross section obtained in said second afocal lens for comprising a linear image.

5. A device of claim 4, in which said first afocal lens comprises a pair of circular converging lenses.

6. A device of claim 4, in which said second afocal lens comprises a pair of convex cylindrical lenses.

7. A recorder device comprising:
   a beam generator means for generating parallel beam;
   a modulator for modulating the parallel beam from said beam generator;
   a modulation signal source for applying modulation signal to said modulator;
   an advance direction changing means for changing the advance direction of the modulated parallel beam from said modulator;
   a mask having a rectangular opening for causing the cross section of said parallel beam changed in its advance direction to be a first rectangular shape;
   an afocal lens comprising a plurality of cylindrical lenses with common focal plane for causing the beam with the first rectangular shape cross section by said mask to have the cross section of a second rectangular shape different from a second rectangular shape different from said first one;
   a converging lens for converging the beam with said second rectangular shape cross section;
   a photosensitive disk body arranged on the focal plane of said converging lens;
   a support body containing said advance direction changing means, said mask said afocal lens and said converging lens;
   a first feeding means to move said support body in the radial direction of said photosensitive disk body: and
   a second feed means to drive said photosensitive disk body in the rotary manner.

8. A recorder device of claim 7, in which said plurality of cylindrical lenses constituting said afocal lens are arranged so that the generatrix thereof is accorded with the radial direction of said photosensitive disk body.

* * * * *

UNITED STATES PATENT AND TRADEMARK OFFICE
CERTIFICATE OF CORRECTION

PATENT NO. : 3,982,253

DATED : September 21, 1976

INVENTOR(S) : TAKESHI GOSHIMA, et al.

It is certified that error appears in the above-identified patent and that said Letters Patent are hereby corrected as shown below:

Column 2, line 59, change "3(c) a illustrate" to -- 3(c) illustrate a --; line 62, change "section (shape" to -- sectional shape --.

Column 3, line 14, after "permitting" insert -- the --; line 15, delete "the" (first occurrence); line 18, change "assumed to" to -- assumed in --.

Column 4, lines 56 and 57, delete "with the rectangular opening"; line 57, after "mask 38" insert -- with the rectangular opening --.

Column 6, line 16, change "for comprising" to -- for composing --; lines 38 and 39, delete "a second rectangular shape different from".

Signed and Sealed this

Twenty-fourth Day of May 1977

[SEAL]

Attest:

RUTH C. MASON
Attesting Officer

C. MARSHALL DANN
Commissioner of Patents and Trademarks